United States Patent [19]

Matzner et al.

[11] Patent Number: 5,230,858
[45] Date of Patent: Jul. 27, 1993

[54] TWO COMPARTMENT WATER ROD FOR BOILING WATER REACTORS

[75] Inventors: Bruce Matzner; Richard A. Wolters, both of San Jose, Calif.

[73] Assignee: General Electric Company, San Jose, Calif.

[21] Appl. No.: 836,479

[22] Filed: Feb. 18, 1992

[51] Int. Cl.$^5$ .............................................. G21C 9/00
[52] U.S. Cl. ................................... 376/282; 376/371; 376/374; 376/444
[58] Field of Search ............... 376/444, 282, 371, 374, 376/379, 447, 443; 976/DIG. 60, DIG. 64

[56] References Cited

U.S. PATENT DOCUMENTS

| | | | |
|---|---|---|---|
| 4,708,846 | 11/1987 | Patterson et al. | 376/444 |
| 4,755,348 | 7/1988 | Shiralkar et al. | 376/282 |
| 4,777,016 | 10/1988 | Yoshioka et al. | 376/444 |
| 4,803,044 | 2/1989 | Patterson | 376/444 |
| 5,023,047 | 6/1991 | Nishida et al. | 376/370 |
| 5,118,467 | 6/1992 | Lippert et al. | 376/443 |

Primary Examiner—Donald P. Walsh
Assistant Examiner—Meena Chelliah
Attorney, Agent, or Firm—J. S. Beulick

[57] ABSTRACT

A fuel bundle for a boiling water nuclear reactor having an improved water rod is disclosed, this water rod having two discrete compartments upper and lower for containing water. The bottom compartment flows moderator from the bottom of the fuel bundle through the water rod compartment to discharge points located through the water rod side walls between the upper most spacers; the top compartment opens upwardly and is naturally filled with liquid moderator settling out of the upwardly flowing moderator during reactor operation. There results the requisite presence of liquid moderator within the water rod for supplying the upper two phase region of the fuel rod with nearly full moderator density. At the same time, water flow through of the water rod from the bottom of the fuel bundle to the upper two phase region of the fuel bundle improves the thermal hydraulic performance. Specifically, water is discharged in the upper two phase region of the fuel bundle at the center of the fuel bundle where the density of the upwardly flowing moderator has the largest vapor fraction. As a result, liquid moderator is injected where it has the maximum beneficial effect on moderator density and the beneficial formation of a liquid film immediately upstream of the spacers. Improved thermal hydraulic performance of the fuel bundle results.

8 Claims, 2 Drawing Sheets

TWO COMPARTMENT WATER ROD FOR BOILING WATER REACTORS

This invention relates to boiling water nuclear reactors and more particularly to fuel bundles used in such reactors. A fuel bundle having an improved water rod is disclosed, this water rod having two discrete upper and lower compartments for containing water.

BACKGROUND OF THE INVENTION

Boiling water nuclear reactors contain discrete fuel bundles clustered together in the central portion of the reactor to form the steam generating core of the reactors. These fuel bundles have lower tie plates for supporting a group of upright fuel rods and admitting water moderator from the lower regions of the nuclear reactor. The bundles include an upper tie plate for maintaining the fuel rods upright and permitting water and generated steam to exit upwardly from the fuel bundle to the upper regions of the nuclear reactor. A channel surrounds both tie plates and the fuel rods extending therebetween to confine the flow path of the moderator between the tie plates and around the steam generating fuel rods. Additionally, fuel bundles contain fuel rod spacers distributed at vertical intervals from the bottom of the fuel bundle to the top of the fuel bundle. These spacers have the mechanical function maintaining the matrix of fuel rods in precise side-by-side relation. This prevents the otherwise flexible fuel rods from coming into abrading contact under the forces of the upward hydraulic flow as well as maintaining the fuel rods in their designed side-by-side relation for improved nuclear performance.

Operation of the fuel bundles within the reactor can be described in terms of both thermal hydraulic performance and nuclear performance.

In terms of thermal hydraulic performance, moderator in the liquid state enters the bottom of each fuel bundle through the lower tie plate, and flows upwardly within the channel and between the fuel rods. During this upward flow increasing amounts of vapor (steam) are generated. At first and in the lower portion of the fuel bundle, liquid flow predominates with an upwardly increasing array of vapor bubbles. Later and in the upper extremities of the bundle, vapor flow predominates with liquid forming an increasingly reduced fraction of the upward moderator flow.

In order to maintain stable boiling within the fuel bundle, it is necessary that each of the fuel rods be coated with a film of liquid moderator (water) during the operation of the reactor. This film of water is particularly critical in the upper two phase (steam and water) region of a boiling water nuclear reactor. Further, the vapor fraction in the upwardly flowing moderator tends to increase to and towards the center of a fuel bundle. Therefore, it is the fuel rods in the central upper portion of the fuel bundle that are particularly critical when it comes to maintaining a film of water present over the surface of the fuel rods.

It has been found that where this film is not present over the surface of a fuel rod, a phenomenon known as boiling transition can occur. Simply stated, in areas of boiling transition, the wall temperature of the fuel rods rapidly rises. Both the long term metallurgical life of the fuel rod cladding as well as the short term mechanical containment of the fuel rods is threatened by boiling transition. For this reason, it is well accepted in the nuclear industry that the absence of film coating the fuel rods in any portion of the fuel bundle of a boiling water nuclear is to be avoided during reactor operation.

The fuel rod spacers distributed at the vertical intervals interior of the fuel bundles have a thermal hydraulic function. It has been found that these spacers cause augmentation of the necessary water film on the fuel rods immediately downstream of the moderator flow within the fuel bundle. In order to understand this phenomenon, some definition of terms and remarks about the complex and little understood phenomenon of boiling within a boiling water nuclear reactor should be made.

First, and regarding the term "downstream of the spacer", the reader will understand that moderator flows from the bottom of the fuel bundle to the top of the fuel bundle. Therefore, the region that is downstream from the spacer is that volume of the fuel bundle immediately above the spacer. Further, it will be understood that it is likely that the region immediately upstream of a spacer (or immediately below the spacer) near the top of a fuel bundle is most likely to have a lack of liquid film coating the fuel rods. These regions of the fuel bundle will most likely be subject to boiling transition.

Second, the problem of boiling relates at least to the interaction of four highly complex variables. These variables are film flow over the surface of the fuel rods, vaporization from the film on the fuel rods, entrainment of liquid film on the fuel rods within the upwardly flowing vapor, and finally deposition of liquid droplets from the upwardly flowing liquid droplets upon the fuel rods to help maintain the film. Simply stated, it has not been possible to accurately predict the interaction of these variables; design of boiling water nuclear reactor fuel bundles and spacers requires considerable testing of actual models in the form of full scale test assemblies.

Finally, and because of the unpredictable interaction resulting in the boiling phenomena of boiling water nuclear reactor fuel bundles, it has been found that different designs of the spacers placed in the upper two phase region of the fuel bundle restore the necessary film coating to different degrees. Thus it will be understood in the following discussion, that the type and total number of spacers in a particular fuel bundle can vary.

Regarding reactor nuclear performance, in a boiling water nuclear reactor, the density of the water is important. Simply stated, the nuclear reaction generates fast neutrons. The continuance of the nuclear reaction requires slow or thermalized neutrons. It is the function of the moderator to moderate the fast neutrons to the thermal state so that the reaction can continue.

The sufficiency of this moderation is a function of the density of the moderator at any particular point within the interior of the reactor. As has already been mentioned, moderator density in the central upper region of the fuel bundle is low.

To correct this condition, it is well known to insert so-called water rods in the interior of a boiling water nuclear reactor fuel bundle. These water rods are filled with liquid moderator to supply to the upper region of the fuel bundle the necessary moderator density for the efficient nuclear reaction.

It is to be understood that conventional water rods, while having the nuclear efficiency of supplying water moderator to the upper central portion of the fuel bundle, have a thermal hydraulic deficiency. Specifically, and in order that the water rods remain full with liquid moderator, water is taken from the bottom of the fuel bundle and shunted directly through a heater rod to the top of the fuel bundle. The water bypasses the steam generating flow within the fuel bundle and to that extent is inefficient in its upward flow through the fuel bundle.

It is the purpose of this invention to provide a fuel bundle with an improved water rod that both continues the water density in the upper two phase region of fuel bundles having water rods and yet improves the thermal hydraulic characteristics of the fuel bundle.

SUMMARY OF THE INVENTION

A fuel bundle having an improved water rod is disclosed, this water rod having two discrete upper and lower compartments for containing water. The bottom compartment flows moderator from the bottom of the fuel bundle through the water rod compartment to discharge points located through the water rod side walls between the upper most spacers; the top compartment opens upwardly and is naturally filled with liquid moderator settling out of the upwardly flowing moderator during reactor operation. There results the requisite presence of liquid moderator within the water rod for supplying the upper two phase region of the fuel rod with moderator density. At the same time, water flow through the lower compartment of the water rod from the bottom of the fuel bundle to the upper two phase region of the fuel bundle improves the thermal hydraulic performance. Specifically, water is discharged in the upper two phase region of the fuel bundle at the center of the fuel bundle where the density of the upwardly flowing moderator has the largest vapor fraction. This discharge preferably occurs between the first and second, or second and third spacers. As a result, liquid moderator is injected where it has the maximum beneficial effect on moderator density and the beneficial formation of a liquid film immediately upstream of the spacers. Improved thermal hydraulic performance of the fuel rods immediately adjacent to the water rods of the fuel bundle results.

DESCRIPTION OF THE PREFERRED EMBODIMENT

Figure 1:
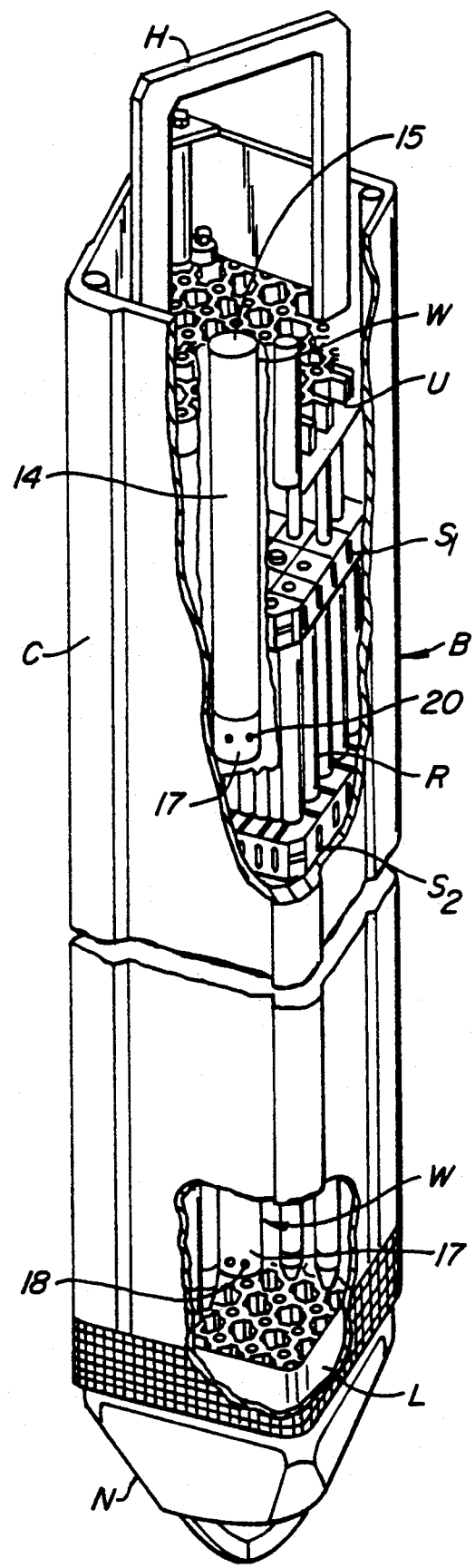
FIG. 1 is a perspective elevation section of a nuclear fuel bundle having an improved water rod according to this disclosure illustrating the flow path of the liquid and vapor moderator.

Referring to FIG. 1, a fuel bundle B is illustrated both partially broken away and cut off in length so that representative portions of the fuel bundle can be seen and understood. Fuel bundle B includes a lower tie plate L forming the upper portion of nose piece N which commonly communicates across a core separation plate (not shown) for receiving water from the lower portion of a reactor (also not shown). Upper tie plate U captures the upstanding end of a group of fuel rods R that extend the full length of fuel bundle B. It will be noted that some fuel rods are partial length, terminating at less than the full distance to upper tie plate U.

Centrally of fuel bundle B there is water rod W. (In some designs more than one may be used.) Water rod W has upper compartment 14 with upwardly exposed open end 15. It is into this open end 15 that liquid moderator (water) falls during normal operation of the fuel bundle to fill the upper compartment 14.

Lower compartment 17 is supplied with lower entrance apertures 18 and upper exit aperture 20. Water from the bottom of fuel bundle B flows through water rod W at lower compartment 17 and exits at exit apertures 20. In FIG. 1, such exit is shown between the first and second spacers S1, S2.

Figure 2:
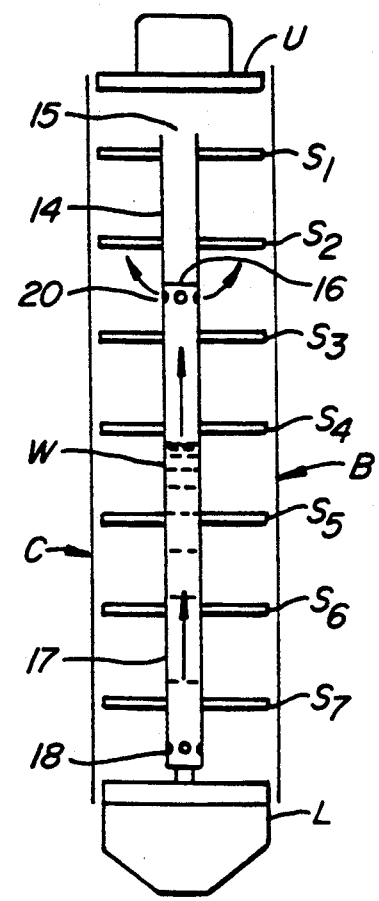
FIG. 2 is a perspective schematic of the water rod of this invention set apart from the fuel bundle of FIG. 1, illustrating schematically the flow path relative to the water rod compartments; and, FIG. 3 is a schematic graphical representation of water film thickness in the upper two phase region of the bundle relative to the illustrated spacers illustrating the relative thickness of the water film covering the fuel rods as a function of position relative to the spacers.

Referring to FIG. 2, a schematic of the invention is illustrated with the schematic being compressed in the vertical direction. Fuel bundle B includes lower tie plate L, upper tie plate U with water rod W extending therebetween. Water rod W has upper compartment 14 with upward opening 15. Water rod W further includes lower compartment 17 with entrance apertures 18 and discharge apertures 20. All seven spacers S1–S7 are illustrated with discharge of the discharges apertures occurring in accordance with the preferred embodiment of this invention between spacers S2–S3.

There is a practical limitation on the length of upper compartment 14. If this compartment becomes too long, it may become the site of unstable flow or "chugging." In this case upward flowing steam at the tube exit will be too great to permit water flow down into the tube. As the completely voided condition is approached, the steam flow will decrease and liquid flow will begin again. This cycle of volume and refilling will continue endlessly. This flouroscillation would not be desired and would defeat the nuclear characteristics of the water rod W. Therefore, we preferred to limit the length of upper compartment 14 to about $\frac{1}{4}$ to $\frac{1}{3}$ the total length of the fuel bundle depending on the counter current flow characteristics of the particular water rod design.

Figure 3:
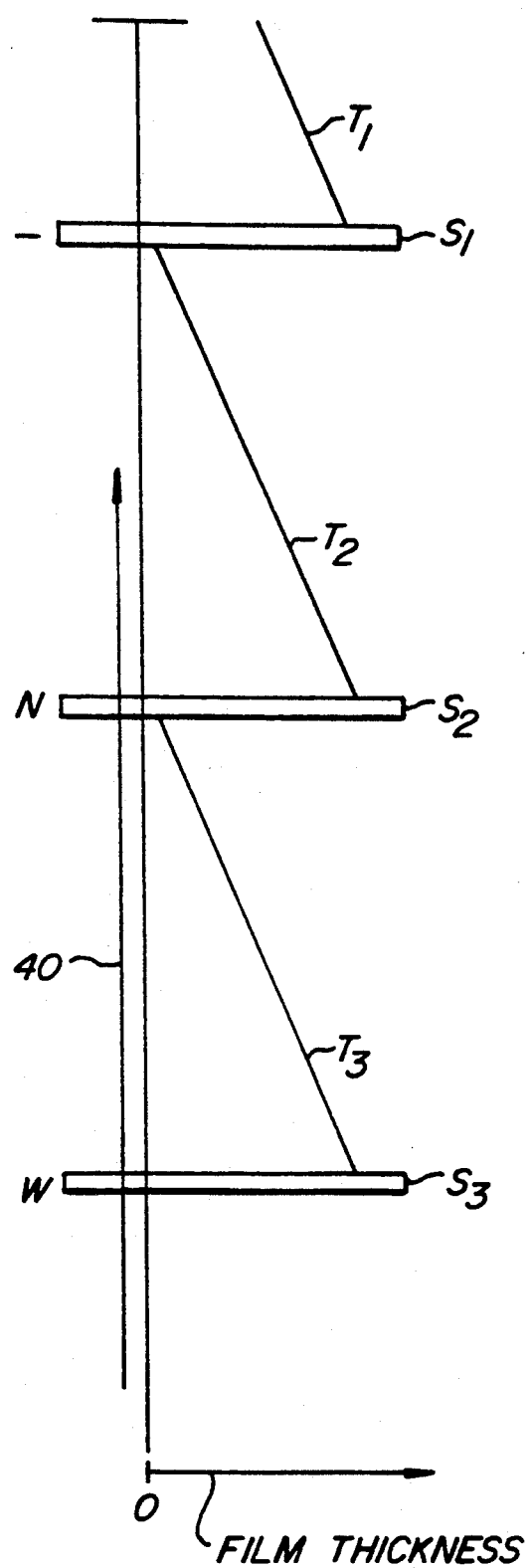

Referring to FIG. 3, mention has been made that the upper two phase region is a portion of the fuel bundle B where the thickness of the liquid film coating the center of the fuel bundle B narrows as the upwardly flowing moderator passes along the fuel rods R between the spacers S3, S2, and S1. Liquid and vapor moderator passes upwardly in the direction of arrow 40. Thickness of the vapor film overlying the central fuel rods R is schematically shown lines T1, T2, and T3. Some remarks may be made relative to the graphic illustration.

First, and relative to line T1, enriched nuclear fuel typically ends near the first spacer. As the line Tl suggests, thickness of the water film over the central rods is generally not a problem in these locations.

Secondly, and with respect to lines T2 and T3, thickness of liquid film over the central fuel rods can be a problem between spacers S1 and S2 or S2 and S3. At flow rates up to in the order of 75%, maximum thinning of the film will typically occur just upstream of spacer S1. As flow increases above 75% flow rate, maximum thinning of the film will typically occur just upstream of spacer S2. Since spacer location may be vertically variable, optimal placement of discharge apertures 20 will be a matter of design.

What is claimed is:

1. In a fuel bundle for boiling water nuclear reactor, said fuel bundle including a matrix of upstanding fuel rods for undergoing nuclear reaction and generating steam, a lower tie plate for supporting the matrix of fuel rods and admitting liquid water moderator to the fuel bundle from the lower portion of said fuel bundle, an upper tie plate for fastening to at least some of the fuel rods and permitting the outflow of liquid and vapor water moderator from the upper portion of said fuel bundle, a channel surrounding said upper and lower tie plates and said fuel rods therebetween for confining moderator flow between said tie plates and around said fuel rods, and a plurality of vertically spaced apart fuel rod spacers, each said spacer surrounding each said fuel rod at the particular elevation of said spacer for maintaining said fuel rods in side-by-side relation, and a water rod for installation to said fuel bundle for supplying liquid moderator to the upper two phase region of said fuel bundle, the improvement to said water rod comprising:

said water rod having a first upper compartment, and a second lower compartment, said upper compartment isolated from said lower compartment;

said first upper compartment defining an open, upwardly exposed end for receiving and maintaining water in said upper water rod compartment during the power generating operation of said fuel bundle will fill with liquid by gravity flow from above;

means communicated to the bottom portion of said lower compartment for receiving water from said lower portion of said fuel bundle; and, means communicated to the upper portion of said lower compartment for discharging water to the interior of said fuel bundle below the upper most spacer of said fuel bundle whereby discharge to said fuel bundle occurs in said upper two phase region of said bundle.

2. The fuel bundle of claim 1 and wherein said means communicated to the upper portion of said lower compartment discharges water to the interior of the fuel bundle occurs between the first and second spacer.

3. The fuel bundle of claim 1 and wherein said means communicated to the upper portion of said lower compartment discharges water to the interior of the fuel bundle occurs between the second and third spacer.

4. The fuel bundle of claim 1 and wherein said fuel bundle has one large central water rod.

5. A fuel bundle for boiling water nuclear reactor, said fuel bundle comprising:

a matrix of upstanding fuel rods for undergoing nuclear reaction and generating steam;

a lower tie plate for supporting the matrix of fuel rods and admitting liquid water moderator tot eh fuel bundle from the lower portion of said fuel bundle;

an upper tie plate for fastening to at least some of the fuel rods and permitting the outflow of liquid and vapor water moderator from the upper portion of said fuel bundle;

a channel surrounding said upper and lower tie plates and said fuel rods therebetween for confining moderator flow between said tie plates and around said fuel rods;

a plurality of vertically spaced apart fuel rod spacers, each said spacer surrounding each said fuel rod at the particular elevation of said spacer for maintaining said fuel rods in side-by-side relation;

a water rod for installation to said fuel bundle for supplying liquid moderator to the upper two phase region of said fuel bundle;

a first upper compartment in said water rod, said first upper compartment defining an open, upwardly exposed end for receiving and maintaining water in said upper water rod compartment during the power generating operation of said fuel bundle;

a second lower compartment in said water rod, said water rod has said upper compartment isolated from said lower compartment;

means communicated to the bottom portion of said lower compartment for receiving water from said lower portion of said fuel bundle; and, means communicated to the upper portion of said lower compartment for discharging water to the interior of said fuel bundle below the upper most spacer of said fuel bundle whereby discharge to said bundle occurs in said upper two phase region of said bundle.

6. In a fuel bundle for a boiling water nuclear reactor, said fuel bundle comprising:

a matrix of upstanding fuel rods for undergoing nuclear reaction and generating steam;

a lower tie plate for supporting the matrix of fuel rods and admitting liquid water moderator to teh fuel bundle from the lower portion of said fuel bundle;

an upper tie plate for fastening to at least some of the fuel rods and permitting the outflow of liquid and vapor water moderator from the upper portion of said fuel bundle;

a channel surrounding said upper and lower tie plates and said fuel rods therebetween for confining moderator flow between said tie plates and around said fuel rods;

a plurality of vertically spaced apart fuel rod spacers, each said spacer surrounding each said fuel rod at the particular elevation of said spacer for maintaining said fuel rods in side-by-side relation;

a water rod for installation to said fuel bundle for supplying liquid moderator to the upper two phase region of said fuel bundle; a process of supplying said water rod with liquid moderator comprising the steps of:

providing a first upper compartment in said water rod;

opening said first upper compartment to receive and maintain water in said upper water rod compartment during the power generating operation of said fuel bundle;

providing a second lower compartment in said water rod, said water rod having said upper compartment isolated from said lower compartment;

communicating in flowing water to the bottom portion of said lower compartment for receiving water from said lower portion of said fuel bundle; and, discharging from the upper portion of said lower compartment to the interior of said fuel bundle below the upper most spacer whereby water discharge to said fuel bundle occurs in said upper two phase region of said bundle.

7. The process of claim 6 and wherein said discharging water to the interior of the fuel bundle occurs between the first and second spacer.

8. The process of claim 6 and wherein said discharging water to the interior of the fuel bundle occurs between the second and third spacer.

* * * * *